Sept. 20, 1966     L. N. SCHUMAN     3,273,366
APPARATUS FOR FINISH-SHAPING SPROCKETS
Filed July 17, 1962     3 Sheets-Sheet 1
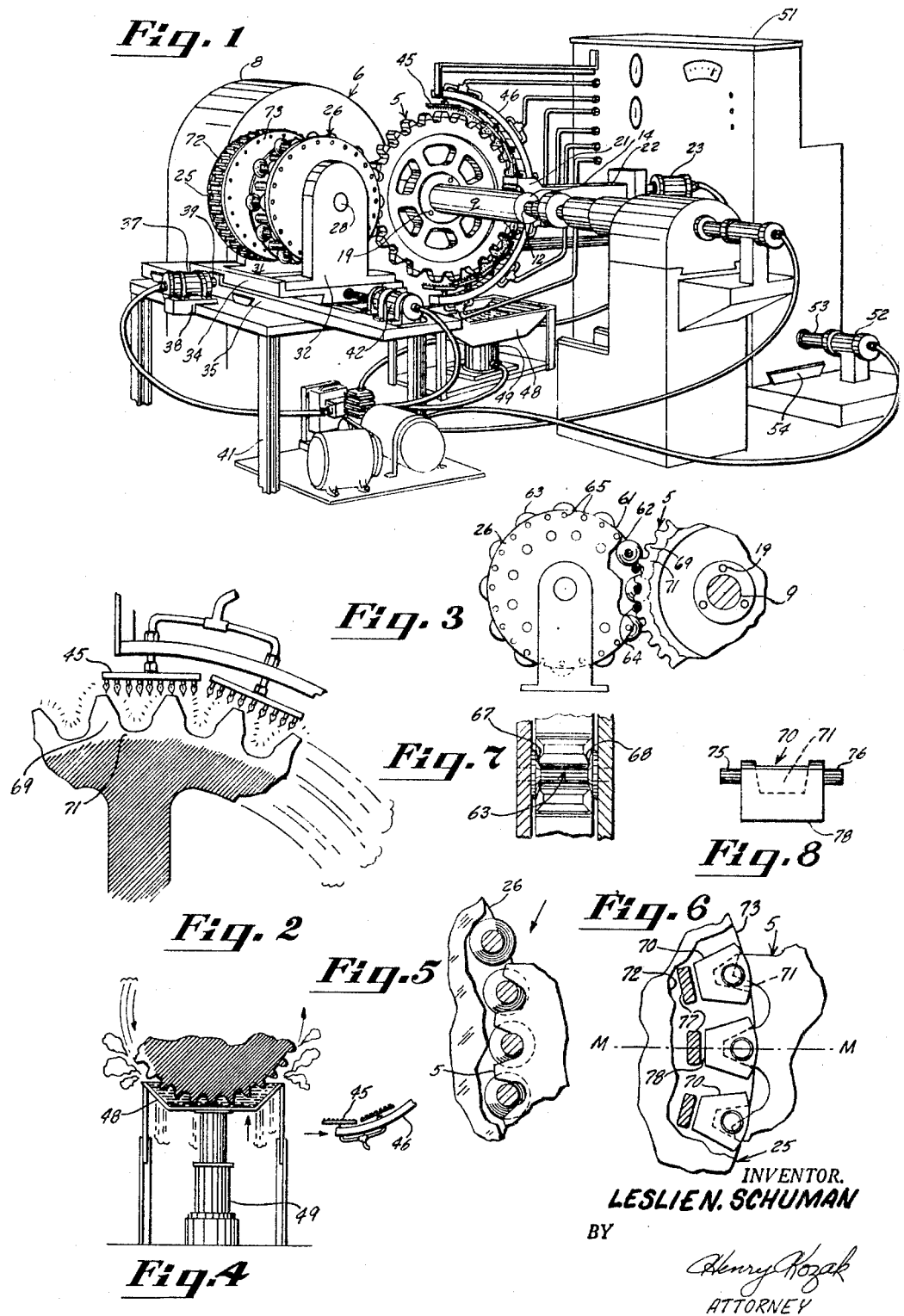
INVENTOR.
LESLIE N. SCHUMAN
BY
Henry Kozak
ATTORNEY Sept. 20, 1966     L. N. SCHUMAN     3,273,366
APPARATUS FOR FINISH-SHAPING SPROCKETS
Filed July 17, 1962     3 Sheets-Sheet 2

INVENTOR.
LESLIE N. SCHUMAN
BY
Henry Kozak
ATTORNEY

Sept. 20, 1966   L. N. SCHUMAN   3,273,366
APPARATUS FOR FINISH-SHAPING SPROCKETS
Filed July 17, 1962   3 Sheets-Sheet 3

INVENTOR.
*LESLIE N. SCHUMAN*
BY
*Henry Hozak*
ATTORNEY

United States Patent Office 3,273,366
Patented Sept. 20, 1966

3,273,366
APPARATUS FOR FINISH-SHAPING SPROCKETS
Leslie N. Schuman, Brecksville, Ohio, assignor, by mesne assignments, to Midland-Ross Corporation, Cleveland, Ohio, a corporation of Ohio
Filed July 17, 1962, Ser. No. 210,511
12 Claims. (Cl. 72—69)

This invention relates to finish-shaping sprocket blanks, such as castings or forgings, into accurately shaped surface-hardened sprockets. This invention is particularly concerned with shaping the sprocket teeth, depressed areas between the teeth, the portions of the sprocket rim which are enveloped by the sprocket rim which are enveloped by the sprocket chain during operation.

In manufacturing sprockets, for example, very large sprockets such as used on large caterpillar type vehicles, the blanks are conventionally shaped by machine tool operations which may include milling, grinding, hobbing, and broaching. The simplest and perhaps cheapest but crudest method in use for shaping the sprocket teeth is simply to grind them to shape with a portable hand grinder. More precise shaping by a more expensive method calls for the use of milling and fixture grinding equipment. Surface hardening of the teeth so shaped entails a subsequent heat treatment involving additional handling of the shaped sprocket blank.

While this invention is advantageous in the production of small sprockets, it is particularly advantageous in manufacturing large sprockets since the cost of finish-shaping it roughly proportional to the weight of the blanks to be shaped.

Hence, it is a primary object of this invention to provide apparatus and method of finish-shaping sprocket blanks which enables the production of sprockets at substantially less cost than that of conventionally produced sprockets.

Another object is to provide a quicker method of finish-shaping, work-hardening, and heat-treating operations entailed in sprocket manufacture.

It is a further object to produce sprockets, especially in the larger sizes, of better quality and higher resistance to wear, then those normally offered to the trade.

According to this invention, a sprocket blank may be mounted on a mandrel and brought into engagement, while being heated, with one set of conformal elements, i.e., a mandrel axis to engage and form the outer portions of the series of dies, relatively spaced and pivotally supported at the outer extremity of a predetermined fixed radius of the sprocket teeth. The sprocket is further engaged alternately or simultaneously in time relation with the aforesaid engagement with another set of conformal elements, i.e., a set of rollers of other shaping elements of arcuate periphery, spaced and pivotally supported to engage a series of the intertooth surfaces of the sprocket at the outer extremity of a predetermined fixed radius of the mandrel axis while the sprocket bank is being rotated. Immediately subsequent to the forming steps just described, the sprocket is quenched to further utilize the heat accumulated in the blank during the shaping procedure. The pivotal elements extend through a plane perpendicular to the mandrel axis.

In a preferred embodiment, the apparatus comprises a mandrel of fixed axis of rotation for supporting a sprocket blank, a rotor comprising a plurality of fixed or rotatable rollers, or other elements of at least partially cylindrical contour, uniformly spaced along a circumference concentric to its axis to engage valley areas between adjacent sprocket teeth, a second rotor carrying dies spaced along a circumference concentric to its axis to engage and form the outer frusto-conical portions of the teeth, and a quench tank supported underneath the mandrel with facility to be raised or lowered from quenching position about the lower part of a sprocket.

According to one embodiment, suitable supporting means is provided for the two rotors to maintain them alternately in a sprocket forming position used by both rotors. In another embodiment, the supporting means is arranged to maintain the rotors in simultaneous engagement with the sprocket blank. The apparatus further includes heaters which are arranged with respect to the region occupied by the sprocket during a working to heat substantially no more of the rim portion of the sprocket than that intended for shaping by the rollers and dies.

In the drawing in respect to which this invention is described below in detail:

FIG. 1 is a perspective view of one embodiment of the invention wherein a sprocket blank is shown positioned within equipment for finish-shaping its rim portion.

FIG. 2 is a fragmentary schematic elevation of the sprocket blank and open flame heaters of FIG. 1 in working position as viewed in the axial direction of the blank.

FIG. 3 is a schematic elevation of one type of valley-forming rotor and a sprocket in working position.

FIG. 4 is a schematic elevation of a sprocket and quenching apparatus in a position disposing the lower portion of the sprocket in a "quench" tank supported by a vertical-lift jack.

FIG. 5 is a fragmentary view with parts in section of meshing portions of a sprocket blank and on another type of a valley-forming rotor.

FIG. 6 is a fragmentary elevation of meshing portions of a sprocket blank and a die-type tooth-forming rotor.

FIG. 7 is a fragmentary view of a valley-forming rotor portion illustrating an individual roller thereof.

FIG. 8 is an elevation of a die taken transversely to its pivotal axis within a die-type rotor.

Considering first the embodiment illustrated in FIG. 1, a sprocket blank 5 is supported in a machine 6 reminiscent of the work-supporting mechanism of a large lathe. This machine comprises driving mechanism housed in the shroud 8, and a mandrel 9 extending outwardly from the driving mechanism in cantilever relation with the shroud 8.

Figure 9:
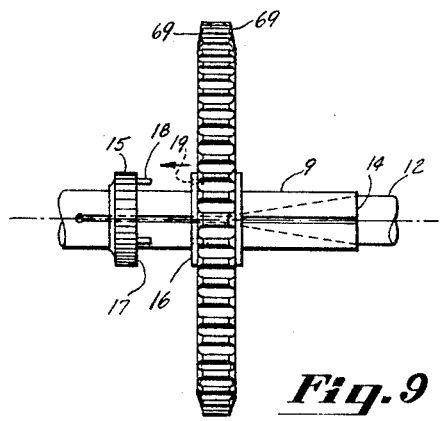
FIG. 9 is a fragmentary elevation showing a sprocket blank mounted on its supporting mandrel in axially offset relation with its normal working position against a positioning and driving collar on the mandrel.

On account of the strong forces to which the sprocket 5 is subjected during finish-shaping of its rim portion, the mandrel 9 is supported from lateral deflection relative to a fixed axis of rotation passing through a "center" element 12 of the machine and a head stock (not shown) for the mandrel within the shroud 8. In the machine shown in FIG. 1, lateral support for the mandrel 9 is obtained partly by projection of the tapered end of the center 12 into a coaxial conical recess tapering inwardly from the end surface 14 of the mandrel. As the mandrel is split longitudinally, for example, along three radial planes 120 degrees apart from the end surface 14 to approximately an anti-rotation collar 15 fixed to the mandrel, spreading of the split portion of the mandrel by the center 12 serves also to secure the sprocket blank 5 from wobbling while being worked. In FIG. 9, the blank is shown separated from the collar 15 against which it is positioned during sprocket forming. In working position, its hub portion 16 engages an end surface 17 of the collar 15 with axially-extending pins 18 of the collar extending into corresponding holes 19 within the hub of the blank 5.

The working pressures exerted by either rotor against the blank 5 and supporting mandrel 9 are further opposed by a yoke 21 adapted to engage the periphery of the mandrel 9 in the manner of a bearing. The yoke 21 forms a terminal portion of a push-rod 22 traversed in its lengthwise direction by a fluid cylinder 23. During operation, the fluid cylinder supports the yoke against the mandrel and a stop fixed to the frame of the machine. When not needed, the yoke is retracted by the cylinder.

The equipment of FIG. 1 further includes two rotors 25 and 26 mounted coaxially in spaced relation on a common shaft 28. A pair of brackets 31 and 32 fixed to a carriage 34 support the rotors 25 and 26 rotatably with respect to the carriage. The carriage is carried by a platform 35 having guides, as shown, cooperating with corresponding guides of the carriage 34 aligned in parallel relation with the mandrel 9. The platform also has guides, as shown, cooperating with guides of a base or table 41 aligned toward and away from the region in which the blank 5 is supported. The position of the carriage relative to the platform 35 and hence the proximity of the rotors 25 and 26 to the axis of the mandrel 9 is adjustable through movement of the platform 35 transversely of the mandrel axis. Such movement is obtained by operation of a fluid cylinder 37 fixed to the table 41 having its piston rod 39 attached to the table 41. Preferably, the cylinder 37 is attached to the table within the radial plane of the sprocket at working position to best utilize the pushing and draft capability of the cylinder.

The carriage 34 is traversed in a direction parallel to the mandrel to dispose either the rotor 25 or rotor 26 in a radial alignment with sprocket blank at working position by a fluid cylinder 42. This cylinder is fixed to the platform 35 with its piston rod attached to the carriage, as shown, to position one rotor or the other in a proper preliminary position for being moved toward the mandrel 9 and into working relation with the sprocket blank 5. The degree of shaping is controlled by suitable stops for the platform mounted on the table.

Figure 10:
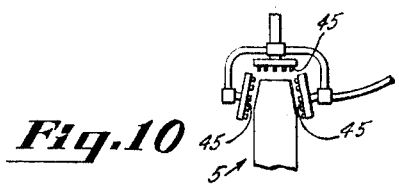
FIG. 10 is a fragmentary elevation of a sprocket blank and open-flame burners showing a disposition of burners with respect to the axial direction of the rotor.

The equipment of FIG. 1 further includes a system of heaters 45 supported, e.g., by an arcuate frame 46 in proximity with the ring portion of the blank 5. Preferably, the heaters or burners 45 use a gaseous fuel intermixed with air or oxygen in a manner well-known to the art to heat the rim portion of the blank to temperatures in a range customary for forging e.g., temperatures of the order of 1900° F. The illustration of the burners in FIGS. 1 and 2 is to be considered schematic rather than actual since the burners are ordinarily disposed in the axial direction of the blank about the rim portion of the blank, as shown in FIG. 10.

In FIGS. 1 and 2, the burners disposed at the side of the blank 5 where left off to simplify illustration. The side burners, however, direct heat into the side surfaces of the teeth and the adjacent circumferentially continuous rim portion in preparation for the reshaping by the rotors.

To permit the mounting of a quench tank 48 on a jack 49 directly under the region occupied by the blank 5 at work position, the heater or burner assembly must be traversable out of radial alignment with the blank 5. As shown, the burner assembly is attached to a cabinet 51 which is movably mounted relative to a floor or other base of movement horizontally into position outside the vertical range of movement of the quench tank 48. As shown, a fluid cylinder 52 anchored to the floor is connected by its piston rod 53 to transverse the cabinet 51 and the heater assembly longitudinally over a rail 54 in a direction parallel to the axis of the mandrel 9. In general, movement of the heater lengthwise of the mandrel 9 will involve less movement than movement toward and away from the mandrel because of the shape of the quenching tank.

Figure 11:
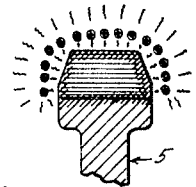
FIG. 11 is a fragmentary cross section of the rim portion of a sprocket blank and an electrical induction type heater.
Figure 12:
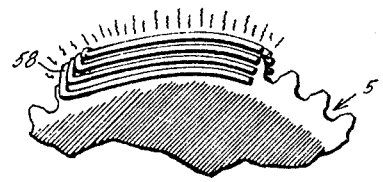
FIG. 12 is a fragmentary side elevation of the sprocket blank and the heater shown in FIG. 11.

An optional mode of heating is illustrated in FIGS. 11 and 12 wherein an induction heater 58 is shown positioned adjacent the rim portion of the blank 5. The heater 58 has a U-shape conformation with respect to its transverse direction as shown in FIG. 11 for inducing heating within all portions of the teeth as well as the adjacent rim portion of the blank.

In FIG. 1 the rotor 26 is shown in engagement working relation with the sprocket blank 5. As more plainly shown in FIG. 3, the rotor 26 consists of a frame having spaced disks 61, 62, between which a group of flanged rollers 63 are arranged in alternate relation with a group of unflanged rollers 64 along a circumference concentric to the axis of the rotor. Each roller of one type is spaced from the adjacent roller of the other type to enable successive valleys of the sprocket to be engaged by successive rollers. The rollers are supported on axles or pins 65 which are secured at both ends to the disks 61 and 62 to form a part of the rotor frame. The rollers thus have axes common with the axes of the pins 61 about which they pivot or rotate. These axes are transverse, and in this case perpendicular, to a plane perpendicular to the mandrel axis.

It is desirable to shape all surfaces of the teeth and the adjacent rim portion of the blank 5 to enable smooth envelopment of such surfaces by a sprocket chain. Hence, the rolls 63 have flanges 67, 68 which engage and shape opposite side surfaces 69 of the teeth and adjacent side surfaces 71 of the blank rim portion.

In most instances, it is preferable to shape a circumferentially continuous surface on each side of the blank disposed radially inwardly from the valleys for receiving connecting links of a sprocket chain. To accomplish such shaping, alternate rollers must be left without flanges and the other set of alternate rollers provided with flanges of sufficient diameter as to overlap side areas of the rim section radially inwardly from the base of each tooth adjacent the valley engaged by the flanged roller. Hence, when the next adjacent valley is engaged by the flanged roller at a later revolution of the blank, the flanges will overlap the area previously engaged so as to shape a circumferentially continuous area inwardly of the bases of the teeth.

In using a rotor as just described, wherein alternate rollers are flanged, complete finishing of the side surfaces of the rim portion of the blank is effected by causing the surfaces missed by the flanges in a previous revolution of the blank to be engaged by the flanges in one or more successive revolutions. This is accomplished by relating the number of teeth of the blank and the number of rolls of the rotor in odd-to-even relationship. For example, if the blank has an odd number of teeth, the number of rollers should be even or vice versa. In a further example, if the number of teeth and the number of rollers differs by one, then the same roller will engage the next adjacent valley in each successive revolution. In a series of revolutions of sufficient number, each valley will be engaged by every roller of the rotor and the valleys consequently will be worked to a uniform shape regardless of minute variations in shaping contributed by individual rollers.

When desired, wiping action on sprocket valley surfaces may be obtained by non-rotatable rollers or other elements having merely circumferentially-partial cylindrical surfaces to engage the blank. Rotatable rollers, however, avoid substantial frictional contact with the blank and hence have longer life.

The rotor 25 comprises a frame similar to that of rotor 26 but instead of valley-forming rollers it further comprises a plurality of dies 70, each provided with a V-shape groove or pocket 71 (see FIGS. 6 and 8) adapted to form the radially outward portion of each sprocket tooth corresponding in a general manner to the addendum portion of gear teeth. The rotor 25 further comprises spaced coaxial disks 72 and 73, each having a plurality of apertures along equal circumferences in which are received trunnions 75 and 76 of the dies. The trunnions 75 and 76 provide a pivotal axis for each die 70 which extends through its groove 71 in transverse relation with a plane perpendicular to the mandrel axis. The two diverging shaping surfaces of the groove 71 are symmetrical as shown with respect to the axis of the die. The dies 70 are intended to have limited angling movement relative to the disks 72 and 73 enabling each die to automatically adjust to the shape of the teeth coming into mesh therewith to thus avoid misshaping the teeth. The angling range of each die is limited by a stop 77 fixed within the rotor frame in spaced but close proximity to a surface of each die, such as the radially inner surface 78. Shaping of the sprocket teeth is effected primarily as the die and the tooth engaged therewith become centered with respect to a plane M—M passing through the axis of the rotor and the blank 5. As the die rotates out of engagement with a corresponding tooth, the die adjusts to the changing angle of the tooth relative to such die and thus retains substantially the shape impressed on the tooth by the die at the plane M—M.

Figure 13:
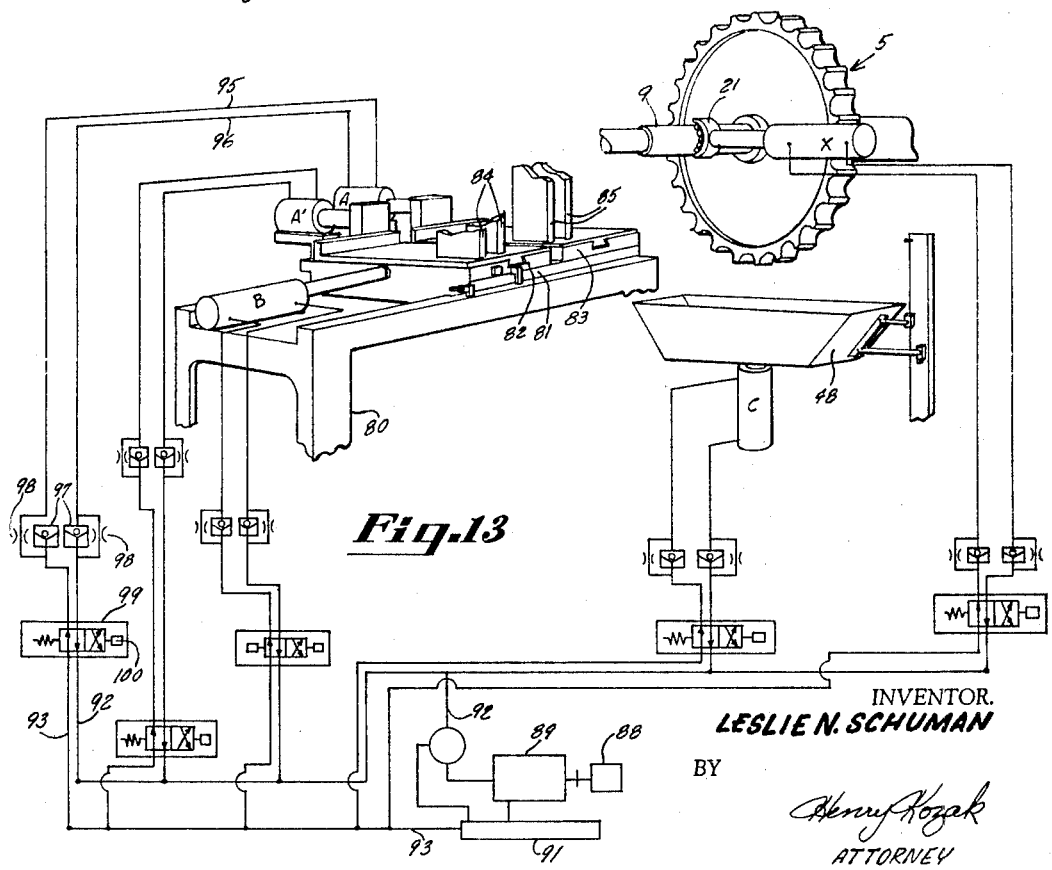
FIG. 13 is in part a schematic view of modified equipment for practicing the invention and in part a hydraulic diagram of the system of actuating reciprocally adjustable parts of the equipment.

FIG. 13 is schematic and fragmentary with respect to a modified apparatus for effecting various operations of the sprocket manufacturing method of this invention, and diagrammatic with respect to a hydraulic system for effecting movements of various portions of the apparatus. The sprocket blank 5 may be mounted on a mandrel similarly provided as shown in FIG. 1. A table 80 has a reciprocable platform 81 in guide relation with the base table for relative movement parallel to the mandrel 9. The platform carries a pair of slides 82, 83 in guide relation therewith for separately supporting the rotors 25 and 26 on respective pairs of brackets 84, 85.

Liquid-actuated cylinders A and A' are affixed to the platform 81 with their piston rods connected with slides 83 and 82, respectively. As the figure indicates, cylinders A and A' are aligned to traverse the slides relative to the platform 81 toward and away from the mandrel or blank 5. The cylinder 8 is fixed to the base portion of the table 80 with its piston rod anchored to the platform 81 to tranverse the platform and hence the respective rotors mounted thereon in a direction parallel to the mandrel 9. Cylinders C and X support and operate a back-up support 21 and a quench tank 48, respectively, in a manner hereinbefore described with respect to cylinders 22 and 49, respectively, of FIG. 1. The various actuating cylinders shown in FIG. 13 are exemplary for purposes of illustrating the hydraulic system and do not exempt other equipment needed to transverse such apparatus as the heating system and the mandrel supporting assembly shown in FIG. 1.

As shown in FIG. 13, the hydraulic system comprises a motor 88, a pump 89, a reservoir 91, a supply line 92, and a return line 93 leading to the reservoir. These components and the other apparatus serving the cylinder A are similar for each cylinder and may be described for purposes of example. Cylinder A and the other cylinders are the double-acting type; cylinder A is connected in the system by lines 95 and 96. Each of these lines have a check valve 97 in parallel connection with a regulating valve 98. The check valve of either line in cooperation with the associated regulating valve restricts the flow of liquid away from the cylinder while liquid is being pumped to the cylinder through the other line and the open check valve thereof. The regulating valve 98 of the line in which liquid was flowing from the cylinder acts to govern the flow to a desired rate. The direction of the movement of liquid through the lines is reversed by a solenoid operated spring-return reversing valve 99 connected with the supply line 92 and the return line 93. The solenoid 100 is energized by a conventional electrical timing device (not shown) which connects with the solenoids of the various other reversing valves to control the various operations and the apparatus in a desired time sequence.

Figure 14:
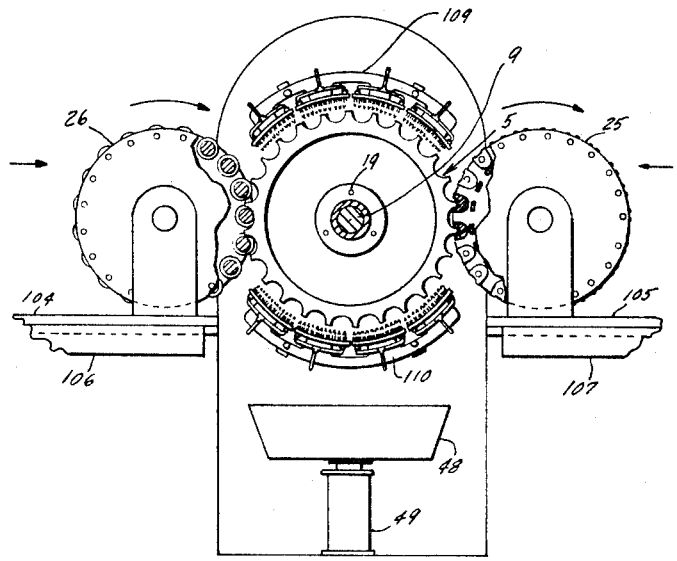
FIG. 14 is a schematic elevation of a further embodiment illustrating sprocket-shaping rotors in working relation with a sprocket blank.

FIG. 14 schematically illustrates an arrangement for operating the rotors 25 and 26 in simultaneous engagement with the sprocket blank 5. In this instance, the rotors are mounted on opposite sides of the mandrel 9 to accomplish respective forming operations on the rim portion of the blank. As shown, the rotors are mounted on separate slides 104, 105, slidable with respect to tables 106 and 107, respectively. The heating assembly is divided into upper and lower sections 109 and 110. The section 110 is supported for movement primarily in a direction parallel to the axis of mandrel 9 in a manner hereinbefore described whereby the quench tank may be moved through its vertical range. While the pressure of the two rotors against the sprocket blank substantially offset each other, it may be desirable in handling very large work to provide back-up support for the mandrel such as that obtained by the suport 21 of FIGS. 1 and 12.

Sprockets produced as described hereinabove have working surfaces and wear resistance comparable to machined and heat-treated forged sprockets while manufactured at substantially less cost. The sprockets herein described are, in general, superior in wear resistance, in freedom from surface defects, and accuracy of shape to sprockets conventionally produced from cast sprocket blanks. By displacing metal during the shaping operations the small voids normally occurring in castings are substantially eliminated along the areas engaged by a sprocket chain. Differential hardening is accomplished without separate heat treatment.

The terms and expressions which have been employed are used as terms of description and not of limitation and there is no intention of excluding such equivalents of the invention described, or of the portions thereof, as fall within the scope of the claims.

What is claimed is:

1. Apparatus for finish-shaping a sprocket rim portion having incompletely shaped teeth and recessed areas therebetween comprising:
 (A) a mandrel for supporting the sprocket with its axis of rotation merged with the axis of rotation of the mandrel;
 (B) a plurality of rollers having cylindrical surfaces of uniform diameter adapted to be separately received between pairs of adjacent teeth of the sprocket;
 (C) means for supporting said rollers with the axes of said cylindrical surfaces in serial uniformly-spaced relationship for meshing relation of the rollers with said teeth, said means movably arranged to successively support each roller in radially non-yielding relation at the extremity of a fixed radius of the mandrel axis; and
 (D) means for rotating the mandrel and moving said supporting means to engage successive rollers with successive recessed areas to reform said areas at said fixed radius.

2. The apparatus of claim 1 wherein: said roller-supporting means comprises a rotor for supporting said rollers with the axes thereof in uniform concentric relation with the axis of rotation of the rotor and within a common surface of revolution thereabout and said axes of the rollers disposed within planes containing the rotor axis.

3. The apparatus of claim 1 wherein: said rollers are spaced by said supporting means at multiples of the distance between two of said depressed areas, and said rollers comprising:
(A) radially extending end flanges adapted to finish-shape the side surfaces of the rim-portion.

4. Apparatus for finish-shaping a sprocket rim-portion having incompletely-shaped teeth and recessed areas therebetween comprising:
(A) a mandrel for supporting the sprocket with its axis of rotation merged with the axis of rotation in the mandrel;
(B) a plurality of rollers adapted to be separately received between pairs of adjacent teeth of the sprocket;
(C) means for supporting the rollers in serial uniformly spaced relationship, said means movably arranged to successively support each roller in non-yielding relation with a fixed radius in relation to the mandrel axis;
(D) means for rotating the mandrel and moving said supporting means to engage successive rollers with successive recessed areas;
(E) a plurality of tooth-forming dies, each die having a V-shaped groove complementary to a desired tooth-shape;
(F) means supporting said dies in serial uniformly-spaced relationship with respect to a separate axis of angling movement for each die passing through its respective groove; and
(G) means for simultaneously rotating the mandrel and moving said support means for the dies to engage said die surfaces defining said grooves of successive dies in one-by-one sequence with successive teeth.

5. Apparatus for finish-shaping a sprocket rim-portion having incompletely-shaped teeth and recessed areas therebetween comprising:
(A) a mandrel for supporting the sprocket with its axis of rotation merged with the axis of rotation of the mandrel;
(B) a rotor having a plurality of rollers of uniform diameter and respective axes of rotation spaced uniformly and concentrically about the rotor's axis of rotation within a common surface of revolution thereabout with the rollers axes disposed within planes containing the rotor axis;
(C) a second rotor having a plurality of dies, each defining a V-shaped groove complementary to a common tooth shape and opening in directions radially away from the axis of rotation of the second rotor;
said dies and axes of rotation therefor spaced within said second rotor in uniform concentric relation with respect to the rotor's axis of rotation, the axis of each die extending through the groove of the respective die within a plane containing the axis of the second rotor, the axes of the dies extending along a surface of revolution concentric to the second rotor axis;
(D) means for supporting both rotors in spaced relation with the axis of the mandrel including adjustable means for bringing said rollers and dies into meshing engagement with said depressed areas and said teeth, respectively, of said sprocket when mounted on said mandrel; and
(E) means for rotating said mandrel with the rotors in said meshing engagement.

6. The apparatus of claim 5 wherein:
said rollers have radially extending end flanges adapted to finish-shape the side surfaces of said rim portion, and
said dies have walls at opposite ends of respective grooves adapted to finish-shape the sides of said teeth.

7. The apparatus of claim 5 wherein:
said rotors are supported by said supporting means in simultaneous meshing engagement with said rim portion at positions angularly spaced with respect to the mandel axis.

8. The apparatus of claim 5 wherein:
the means for supporting both rotors disposes both rotors at one side of the mandrel axis and includes means for moving the rotors in a direction parallel to said axis and transversely to said axis for alternative application of the rotors to a sprocket.

9. The apparatus of claim 5 wherein:
there exists an odd-to-even relationship between the number of teeth of a sprocket carried on the spindle and the number of dies and rollers considered separately.

10. The apparatus of claim 5 comprising:
(A) heating means for selectively applying heat to said teeth and rim areas adjacent thereto.

11. The apparatus of claim 5 for finish-shaping a sprocket rim portion wherein the axes of said rotors are horizontal and in generally horizontal relation with said mandrel axis, and the apparatus comprises:
(A) an open-top quench tank;
(B) vertical adjustable means for supporting the tank underneath said mandrel and the region occupied by said sprocket;
(C) heating means for selectively applying heat to said teeth and rim areas adjacent thereto; and
(D) means for shifting the heating means out of operable position to permit elevation of said quench tank into quenching position about the lower part of said sprocket.

12. Apparatus for finish-shaping a sprocket rim portion having incompletely shaped teeth and recessed areas therebetween comprising:
(A) a mandrel for supporting the sprocket with its axis of rotation merged with the axis of rotation of the mandrel;
(B) a plurality of conformal elements, each having a pivotal axis extending in a direction transversely through a plane perpendicular to the mandrel axis, and tooth-forming surfaces in symmetrical relation with said axis of the element;
(C) means for supporting said elements with the axes thereof in serial, uniformly-spaced relationship for effecting meshing relation of the elements with said teeth; said supporting means being arranged to successively support each element in radially non-yielding relation with the mandrel axis as each element and the tooth areas to be shaped thereby engage at the extremity of a predetermined fixed radius of the mandrel axis; and
(D) means for rotating the mandrel and moving said supporting means to engage successive elements with successive tooth areas similar to said teeth areas.

References Cited by the Examiner

UNITED STATES PATENTS

| 132,899 | 11/1872 | Comly | 72—69 |
| 935,636 | 10/1909 | Brun | 78—45 X |
| 1,228,050 | 5/1917 | Robinson | 29—159.2 X |
| 1,642,179 | 9/1927 | Schurr | 72—105 |
| 2,464,658 | 3/1949 | Stivin | 78—45 X |

FOREIGN PATENTS

| 885,103 | 12/1961 | Great Britain. |

CHARLES W. LANHAM, *Primary Examiner.*

W. A. WILTZ, *Examiner.*

UNITED STATES PATENT OFFICE
CERTIFICATE OF CORRECTION

Patent No. 3,273,366                                September 20, 1966

Leslie N. Schuman

It is hereby certified that error appears in the above numbered patent requiring correction and that the said Letters Patent should read as corrected below.

Column 1, line 14, strike out "by the sprocket rim which are enveloped"; line 49, after "radius" insert -- of the mandrel axis to engage and form the outer portions --; line 53, for "of", second occurrence, read -- or --; line 57, for "bank" read -- blank --; column 3, line 63, for "where" read -- were --; line 73, for "of" read -- for --; column 4, line 15, for "engagement" read -- engaged --; column 5, line 47, for "cylinder 8" read -- cylinder B --; line 49, for "tranverse" read -- traverse --; line 57, for "transverse" read -- traverse --.

Signed and sealed this 22nd day of August 1967.

(SEAL)
Attest:

ERNEST W. SWIDER                                EDWARD J. BRENNER
Attesting Officer                            Commissioner of Patents